(12) United States Patent
Jirskog

(10) Patent No.: US 8,069,721 B2
(45) Date of Patent: Dec. 6, 2011

(54) RADAR LEVEL GAUGE SYSTEM HAVING LIMITED TRANSMISSION POWER

(75) Inventor: Anders Jirskog, Huskvarna (SE)

(73) Assignee: Rosemount Tank Radar AB, Gothenburg (SE)

( * ) Notice: Subject to any disclaimer, the term of this patent is extended or adjusted under 35 U.S.C. 154(b) by 1106 days.

(21) Appl. No.: 11/809,179

(22) Filed: May 31, 2007

(65) Prior Publication Data

US 2008/0282794 A1 Nov. 20, 2008

(30) Foreign Application Priority Data

May 16, 2007 (SE) ..................................... 0701231

(51) Int. Cl.
*G01F 23/00* (2006.01)

(52) U.S. Cl. ...................................... 73/290 V

(58) Field of Classification Search ........................ None
See application file for complete search history.

(56) References Cited

U.S. PATENT DOCUMENTS

| | | | | |
|---|---|---|---|---|
| 3,278,850 A | * | 10/1966 | Tomizawa et al. | 455/523 |
| 5,734,346 A | * | 3/1998 | Richardson et al. | 342/124 |
| 5,752,171 A | * | 5/1998 | Akiya | 455/127.3 |
| 6,686,875 B1 | | 2/2004 | Wolfson et al. | 342/175 |
| 2006/0000275 A1 | | 1/2006 | Nilsson et al. | 73/290 |
| 2007/0101810 A1 | | 5/2007 | Eriksson et al. | 73/290 |

FOREIGN PATENT DOCUMENTS

| | | |
|---|---|---|
| EP | 0362992 | 4/1990 |
| EP | 1562051 | 8/2005 |

OTHER PUBLICATIONS

Communication for EPO Application No. 08156277.9-1234/1992922 dated Jul. 3, 2009; 4 pages.
International Search Report for PCT/SE2008/050572, dated Aug. 19, 2008.

* cited by examiner

*Primary Examiner* — Hezron E Williams
*Assistant Examiner* — Alex Devito
(74) *Attorney, Agent, or Firm* — Westman, Champlin & Kelly, P.A.

(57) ABSTRACT

A radar level gauge system, for determining a filling level of a product contained in a tank, the radar level gauge system comprising a transceiver including a signal generator for generating electromagnetic signals for transmission; a transmitter branch for transmitting the electromagnetic signals; and a receiver branch for receiving electromagnetic signals, the transmitter branch and the receiver branch each being connected to a transceiver input/output terminal. The radar level gauge system further comprises a propagation device for allowing transmitted electromagnetic signals to propagate towards a surface of the product inside the tank, where signals are reflected, and for returning reflected electromagnetic signals back from the surface of the product; processing circuitry connected to the transceiver and configured to determine the filling level based on the reflected electromagnetic signals; and power level adjusting circuitry connected between the transceiver input/output terminal and the propagation device, and configured to adjust a power level of the transmitted electromagnetic signals by a transmission gain factor, and to adjust a power level of the returned reflected electromagnetic signals by a reception gain factor, the transmission gain factor being smaller than the reception gain factor, wherein the power level adjusting circuitry comprises at least one active component.

25 Claims, 3 Drawing Sheets

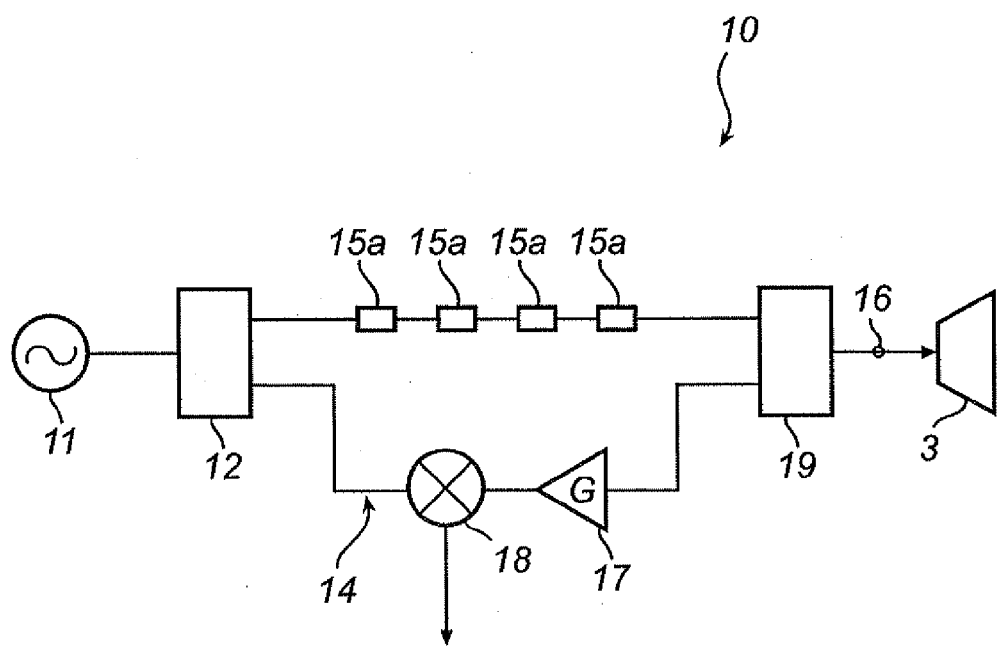
(Prior art) Fig. 1
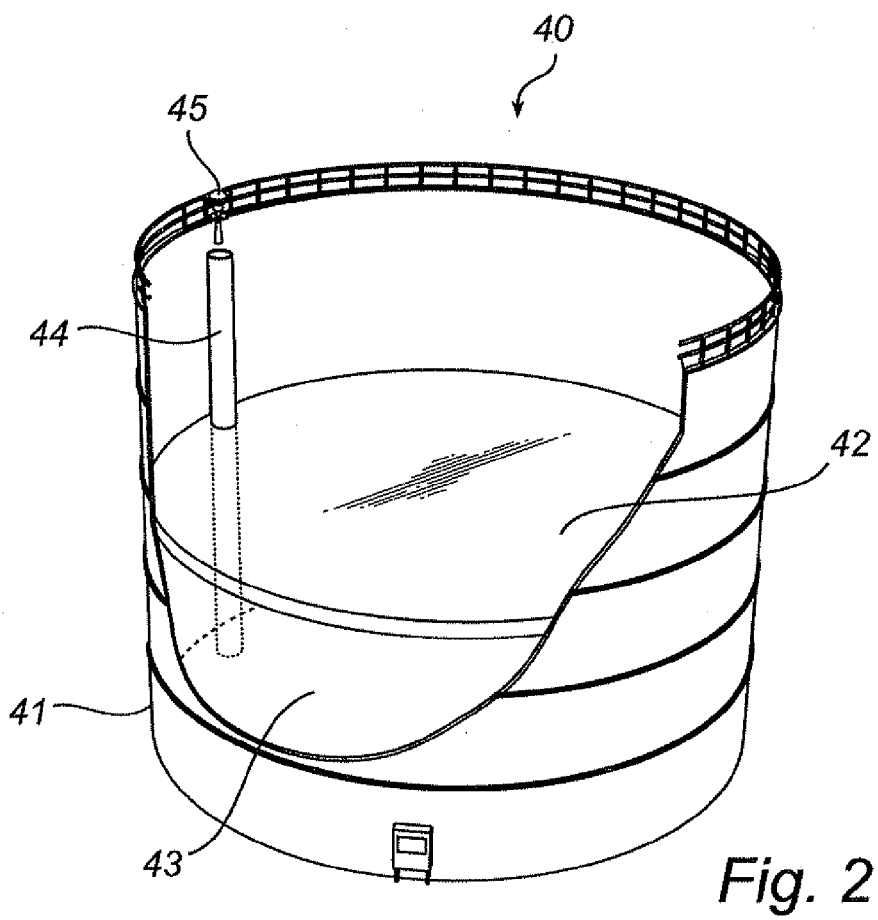
Fig. 2

RADAR LEVEL GAUGE SYSTEM HAVING LIMITED TRANSMISSION POWER

The present application is claims priority of Sweden patent application Serial No. 0701231-3, filed May 16, 2007, the content of which is hereby incorporated by reference in its entirety.

TECHNICAL FIELD OF THE INVENTION

The present invention relates to a radar level gauge system, for level determination of a product, in particular a radar level gauge system having a limited transmission power.

TECHNICAL BACKGROUND

Radar level gauge systems are today in use in a variety of fields of application for accurate level determination, as well as for determination of other product parameters, such as temperature, flow etc. For determining the level of a product by means of a radar level gauge system, electromagnetic signals are transmitted and propagated, usually by means of an antenna, towards a surface of the product, where signals are reflected. The reflected signals are received by the radar level gauge system, and the distance between a reference position and the surface of the product is determined by comparing the transmitted signals with the reflected signals. Based on this distance, the filling level can be determined.

Especially in open or semi-open applications, such as open tanks, floating-roof tanks, reservoirs, or even rivers or lakes, the operation of a radar level gauge system is typically subject to government regulations in respect of such parameters as the frequency and power of the transmitted signals.

According to such existing and/or anticipated regulations, the transmission power should be limited to a certain level. At the same time, the quality of measurement, such as the accuracy with respect to distance, of the radar level gauge system should not be sacrificed to obtain this transmission power level.

Such a limited transmission power in combination with high quality measurement is readily achievable in a radar level gauge system having a transceiver with separated transmitter output and receiver input, the output being connected to a transmission antenna, and the input to a receiver antenna, but considerably more difficult to achieve for a transceiver having a common transceiver input/output terminal.

In present solutions for achieving an low transmission power level in a radar level gauge having such a transceiver with a common input/output terminal, and a single antenna, it has proven to be very difficult, if at all possible, to at the same time achieve a sufficiently low output power, say −40 dBm (100 nW) or lower and a sufficiently accurate measurement of the filling level.

One such existing solution is schematically illustrated in FIG. 1. In FIG. 1, a transceiver 10 is shown, having a signal generator 11 connected to power dividing circuitry, here in the form of a Wilkinson Power Divider (WPD) 12. After the WPD 12, the line is divided into a transmitter branch 13 and a receiver branch 14. The transmitter branch 13 and the receiver branch 14 are connected to a transceiver input/output terminal 16 via a second WPD 19. In order to attenuate the transmitted electromagnetic signals, resistive damper circuits, or so-called pads, 15a-d are provided on the transmitter branch 13. Typically, using surface mounted components as damper circuits 15a-d, an attenuation of about 20 dB can be achieved.

After having been attenuated in the transmitter branch 13, the transmitted electromagnetic signals pass the second WPD 19 on their way towards the antenna 3.

As for reflected electromagnetic signals picked up by the antenna 3, these signals are divided by the second WPD 19, and the fraction of the reflected signals going into the receiver branch are amplified by an amplifier 17 and mixed with signals from the signal generator 11 in a mixer 18. The distance to the relevant surface can then be determined based on the output from the mixer 18.

In this solution, however, the desired combination of low transmission power and high quality of measurement is difficult to obtain.

SUMMARY OF THE INVENTION

In view of the above-mentioned and other drawbacks of the prior art, a general object of the present invention is to provide an improved radar level gauge system, and in particular a radar level gauge system capable of combining a sufficiently low transmission power to comply with various regulations with a high quality of measurement, including measurement accuracy.

According to a first aspect of the present invention, these and other objects are achieved through a radar level gauge system, for determining a filling level of a product contained in a tank, the radar level gauge system comprising: a transceiver including: a signal generator for generating electromagnetic signals for transmission; a transmitter branch for transmitting the electromagnetic signals; and a receiver branch for receiving electromagnetic signals, the transmitter branch and the receiver branch each being connected to a transceiver input/output terminal; a propagation device for allowing transmitted electromagnetic signals to propagate towards a surface of the product inside the tank, where signals are reflected, and for returning reflected electromagnetic signals back from the surface of the product; processing circuitry connected to the transceiver and configured to determine the filling level based on the reflected electromagnetic signals; and power level amplifying circuitry connected between the transceiver input/output terminal and the propagation device in such a way that the transmitted electromagnetic signals are attenuated and the reflected electromagnetic signals are amplified.

According to a second aspect of the present invention, the above-mentioned and other objects are achieved through a radar level gauge system, for determining a filling level of a product contained in a tank, the radar level gauge system comprising: a transceiver including: a signal generator for generating electromagnetic signals for transmission; a transmitter branch for transmitting the electromagnetic signals; and a receiver branch for receiving electromagnetic signals, the transmitter branch and the receiver branch each being connected to a transceiver input/output terminal; a propagation device for allowing transmitted electromagnetic signals to propagate towards a surface of the product inside the tank, where signals are reflected, and for returning reflected electromagnetic signals back from the surface of the product; processing circuitry connected to the transceiver and configured to determine the filling level based on the reflected electromagnetic signals; and power level adjusting circuitry connected between the transceiver input/output terminal and the propagation device, and configured to adjust a power level of the transmitted electromagnetic signals by a transmission gain factor, and to adjust a power level of the returned reflected electromagnetic signals by a reception gain factor, the transmission gain factor being smaller than the reception gain factor, wherein the power level adjusting circuitry comprises at least one active component.

By "propagation device" should, in the context of the present application, be understood a device capable of propagating electromagnetic signals. The propagation device may be an antenna, such as a horn antenna, a rod antenna, a patch antenna, an array antenna etc. In some applications, such as so-called floating roof tanks, the antenna is often referred to as mode converter or mode generator.

The tank may be any container or vessel capable of containing a product, and may be metallic, or partly or completely non-metallic, open, semi-open, or closed.

The transmitter branch and the receiver branch may be physically separated, or may coincide. In the latter case, the transmitter and receiver branches may, for example, be implemented utilizing a so-called "leaky mixer".

By "active component" should, in the context of the present application be understood a component that can be used to provide a power gain factor greater than unity (unity=0 dB) in an electronic circuit. Active components include, for example, transistors, operational amplifiers, electron tubes (thermionic valves) etc.

Either of the transmission gain factor and the reception gain factor may be smaller than unity (negative in dB), whereby signals are attenuated, or greater than unity (positive in dB), whereby signals are amplified.

The present invention is based upon the realization that the desired low transmission power level, in combination with high accuracy measurement can be obtained by simultaneously adjusting the power levels of the transmitted electromagnetic signals and of the returned reflected electromagnetic signals with different gain factors, where the gain factor for the transmitted electromagnetic signals is lower than for the returned reflected electromagnetic signals, and by doing this between the transceiver input/output terminal and the antenna. For example, the transmitted electromagnetic signals may be attenuated and the returned reflected electromagnetic signals may be amplified, or both the transmitted and the returned reflected electromagnetic signals may be attenuated, but the transmitted signals attenuated more than the returned reflected signals. In this manner a reduction in the transmission power and a maintained isolation (sufficiently low local oscillator leakage) of the receiver branch can obtained simultaneously, through the inclusion of relatively uncomplicated and affordable circuitry between the transceiver input/output terminal and the antenna.

In order to achieve the desired simultaneous and direction dependent power level adjustment, power level adjusting circuitry is, according to the present invention, connected between the transceiver input/output terminal and the propagation device. This power level adjusting circuitry may be any kind of circuitry capable of direction-dependent power level adjustment of electromagnetic signals, for example by amplifying electromagnetic signals traveling in one direction and attenuating electromagnetic signals traveling in the opposite direction.

According to one embodiment, such circuitry may be transistor-based. Examples of such transistor-based power level adjusting circuitry include various types of commercially available amplifiers and attenuators, as well as custom made amplifier/attenuator circuitry such as can be realized using one or several suitable transistors and passive components.

Regardless of by means of which specific circuits the power level adjusting/amplifying circuitry is realized, the circuitry may advantageously be designed in such a way that the equivalent waveguide length thereof is substantially independent of the environmental conditions, such as temperature, and/or operating point, in respect of parameters such as current and voltage, of the power adjusting/amplifying circuitry.

This may be achieved by designing the power level adjusting circuitry so that it has a small physical extension in relation to a wavelength of the transmitted/received electromagnetic signals. For example, the power level adjusting circuitry may advantageously be designed in such a way that an equivalent length of a transmission path of the electromagnetic signals therethrough is considerably shorter than the wavelength of the electromagnetic signals, such as shorter than half the wavelength of the electromagnetic signals. Consequently, the extension of the power level adjusting circuitry can be permitted to be larger for a larger wavelength of the electromagnetic signals. This minimum physical extension can, for example, be realized by not implementing various stub lines etc that are typically used for microwave circuits, and thereby trading optimum performance for a reduced variability of the equivalent waveguide length. physical extension of said power level amplifying circuitry is minimized in relation to a wavelength of said electromagnetic signals, in such a way that an equivalent length of a transmission path of said electromagnetic signals through said power level amplifying circuitry is reduced to a distance smaller than said wavelength of the electromagnetic signals.

The "equivalent waveguide length" or equivalent length of transmission path, which is sometimes also referred to as "inner length", is a property that indicates how circuitry influences electromagnetic signals passing therethrough with respect to transmission parameters, such as reflection due to discontinuities in impedance along the route of the electromagnetic signals through the circuitry. The effect of the various reflections can be expressed as an equivalent length of a transmission path, or, in other words, an equivalent waveguide length, which is equivalent to a group delay of the electromagnetic signals. It should be noted that this does not necessarily mean that the circuitry in question is a waveguide or even includes a waveguide, but that it can be represented by a waveguide having a certain length when describing its impact on signals passing therethrough. By keeping the equivalent waveguide length substantially constant and/or monitoring the changes in the equivalent waveguide length and compensating for these changes, an improved measurement accuracy can be achieved, since the distance between the surface to be gauged and a reference position typically depends on the equivalent waveguide length of the circuitry between the antenna and the terminal of the transceiver where a signal indicative of the distance is output.

BRIEF DESCRIPTION OF THE DRAWINGS

These and other aspects of the present invention will now be described in more detail, with reference to the appended drawings showing a currently preferred embodiment of the invention, wherein:

FIG. 1 is a schematic block diagram of a conventional transceiver comprised in a radar level gauge system, for attenuating transmitted electromagnetic signals while maintaining receiver branch isolation;

FIG. 2 illustrates an exemplary application for the radar level gauge system according to the present invention;

DETAILED DESCRIPTION OF A PREFERRED EMBODIMENT OF THE INVENTION

Figure 3:
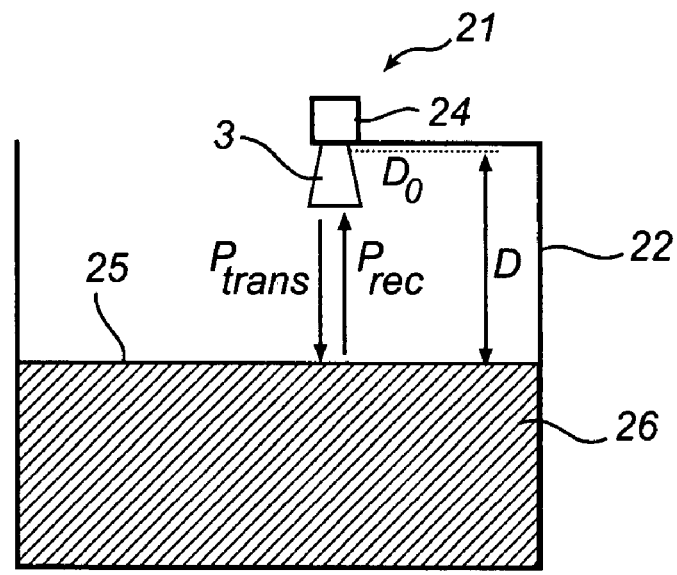
FIG. 3 is a schematic illustration of a radar level gauge system according to an embodiment of the invention.

In the present description, embodiments of the present invention are mainly described with reference to a radar level gauge system having a horn antenna and being mounted on an open tank containing a product. It should be noted that this by no means limits the scope of the invention, which is equally applicable to radar level gauge systems implemented in other applications, open, semi-open as well as closed, such as for level determination in open tanks, floating roof tanks, reservoirs, rivers and other watercourses, etc.

Moreover, the radar level gauge system according to the present invention may be equipped with any other type of antenna or mode converter, such as a patch antenna, a rod antenna or an array antenna.

FIG. 2 illustrates an exemplary semi-open application for the radar level gauge system according to the present invention, in the form of a floating roof tank system.

In FIG. 2, a floating roof tank system 40 is shown, with a tank 41 having a roof 42 that floats on the product 43 contained in the tank 41. The product 43 is often a petroleum product and the roof floats thereon in order to prevent or at least reduce the presence of a gas phase of the product 43 in the tank 41. When determining the level of the product 43 in the tank 41, it is typically not sufficient to simply measure the position of the floating roof 42, since the roof 42 may not perfectly and smoothly follow a change in the level of the product 43, but may move in a step-wise fashion.

For enabling accurate measurement of the level of the product 43 at all times, the floating roof tank system 40 in FIG. 2 is equipped with a measurement pipe 44, which extends through the floating roof 42 into the product 43. At the top of the measurement pipe 44, a radar level gauge system 45 is arranged for level determination in the measurement pipe 44.

The exemplary application illustrated in FIG. 2 is one example of an application for radar level gauge systems, in which it is anticipated that the total transmitted power of the radar level gauge system may be required by government regulations to be maintained below a certain level.

Turning now to FIG. 3, a radar level gauge system 21 according to an embodiment of the present invention is schematically shown mounted on an open tank 22. The radar level gauge system 21 has a propagating device, here in the form of a horn antenna 3, and a control unit 24 including (although not shown in FIG. 3) a transceiver, processing circuitry, and typically an interface for enabling communication with an external control station and/or other sensing devices, such as temperature and/or pressure sensing devices.

In order to determine the filling level of the product 26 contained in the tank 22, the distance D between a reference position $D_0$ and the surface 25 of the product 26 in the tank 22 is measured. This is done by transmitting electromagnetic signals which are allowed to propagate towards the surface 25 of the product 26, where a fraction of the power of the transmitted signals is reflected as reflected electromagnetic signals. These reflected electromagnetic signals are received by the antenna 3 and passed on to the transceiver.

The distance D is then determined by the processing circuitry in the control unit 24 by comparing the received reflected electromagnetic signals with the transmitted electromagnetic signals. This is typically done by mixing the reflected electromagnetic signals with signals indicative of the transmitted electromagnetic signals and analyzing the resulting interference signal.

For open tank applications in particular, the frequency and the transmitted power level $P_{trans}$ of the transmitted electromagnetic signals should comply with government regulations and relevant available and anticipated standards.

Figure 4:
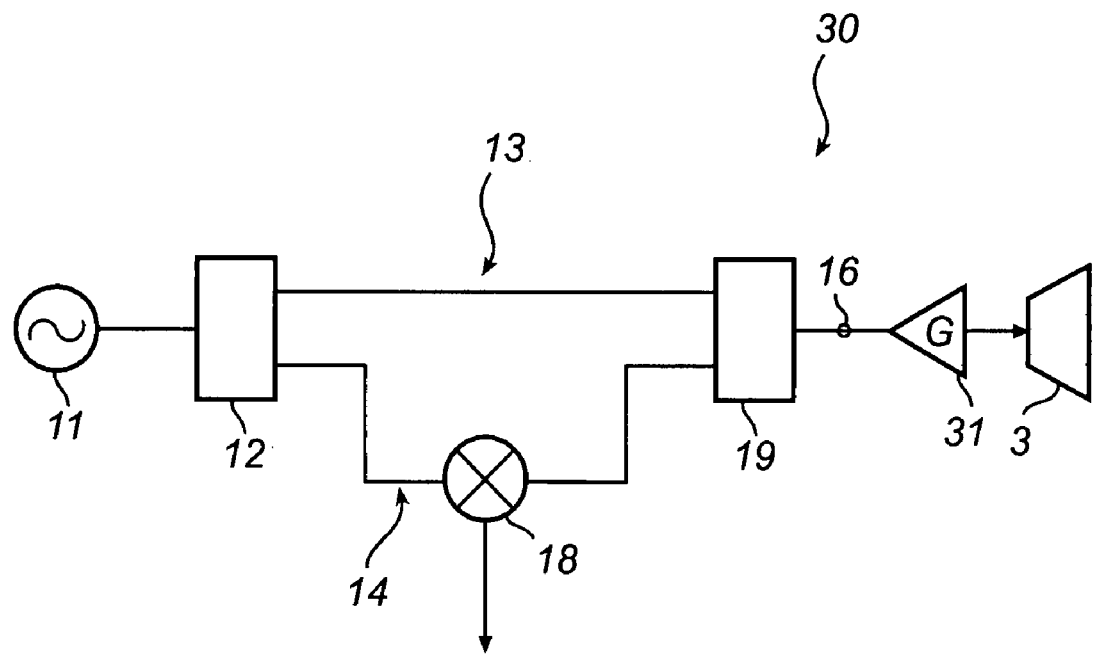
FIG. 4 is a schematic block diagram of a transceiver comprised in a radar level gauge system according to an embodiment of the present invention.

With reference to FIG. 4, a transceiver 30 comprised in a radar level gauge system according to an embodiment of the present invention is schematically shown. The transceiver 30 in FIG. 4 differs from the prior art transceiver in FIG. 1 in that the attenuation takes place after the transmitter branch 13 and the receiver branch 14 have been connected to each other at the transceiver input/output terminal 16. To this end, power level adjusting/amplifying circuitry, in the form of an amplifier 31 is connected between the transceiver input/output terminal 16 and the antenna 3. The amplifier 31 is connected to attenuate transmitted signals and to amplify received signals.

If the amplifier 31 is provided in the form of a one-stage amplifier, a wideband attenuation of about 20 dB of the transmitted signals and a wideband amplification of about 10 dB of the received signals can be achieved.

By providing the amplifier 31 in the form of a two-stage amplifier, a wideband attenuation of about 40 dB of the transmitted signals and a wideband amplification of about 20 dB of the received signals can be achieved.

Figure 5:
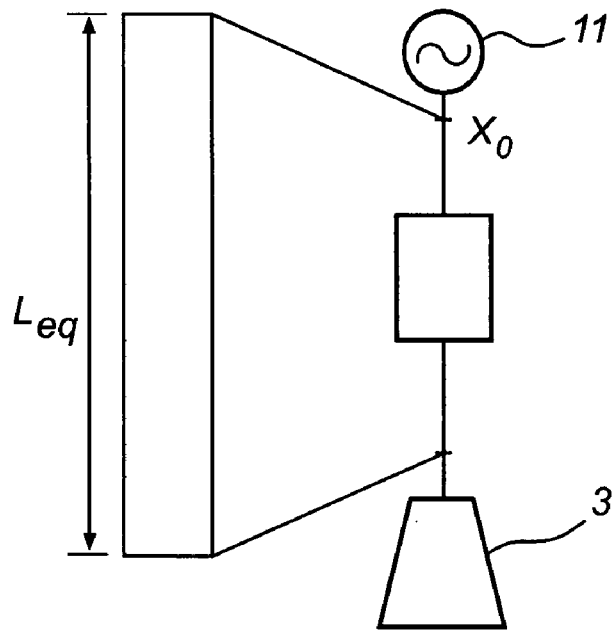
FIG. 5 schematically illustrates the concept of an equivalent waveguide length.

As is schematically illustrated in FIG. 5, the circuitry in a radar level gauge system between a reference position $x_0$ and the antenna 3 can, from a signal propagation point of view, be seen as a waveguide having an equivalent waveguide length $L_{eq}$. This equivalent waveguide length, or equivalent length of transmission path, can also be seen as a kind of accumulated voltage standing wave ratio VSWR of the system.

When this equivalent waveguide length $L_{eq}$, for any reason, is changed, the perceived distance to the surface 25 of the product 26 in the tank (referring to FIG. 3) is also changed.

Figure 6:
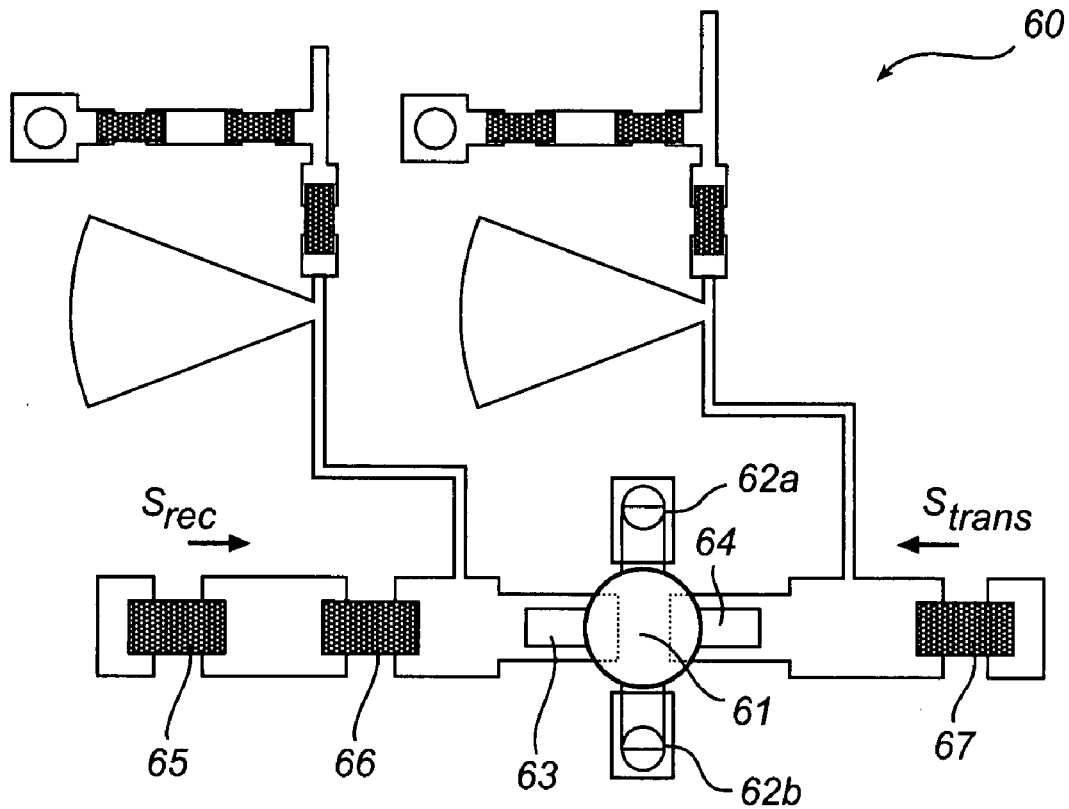
FIG. 6 is a schematic circuit layout for simple power level adjusting circuitry having a physical extension which is minimized in terms of the wavelength of the transmitted signals to reduce variations in the equivalent waveguide length thereof.

With reference to FIG. 6, simple power level adjusting circuitry, here in the form of a one-stage amplifier 60, which is designed to keep variations in the equivalent waveguide length thereof small, will now be described.

The one-stage amplifier 60 in FIG. 6 comprises an FET-transistor 61 having two source terminals 62a-b, which are connected to ground, a gate terminal 63 and a drain terminal 64. The transistor 61 is biased by applying desired voltages to the gate and drain terminals, 63, 64, respectively.

When implemented in the radar level gauge system according to the present invention, signals $S_{trans}$ to be transmitted are fed to the one-stage amplifier 60 from the right in FIG. 6. The signals pass a capacitor 67 for filtering out any DC-signals and come to the drain terminal 64 of the transistor 61. As a result thereof, adjusted signals (typically attenuated signals) will be present at the gate terminal 63 of the transistor 61. These adjusted signals for transmission, are then passed through an optional stabilizing resistor 66 and a capacitor 65 (which is typically not included in the amplifier 60 when the antenna is directly connected on the left hand side thereof in FIG. 6) and are fed to the antenna (not shown in FIG. 6). As for received signals, $S_{rec}$, these arrive from the left hand side of FIG. 6 and are amplified or attenuated by the amplifier 60 depending on its bias settings.

As is evident from FIG. 6, the amplifier 60 shown therein is very compact along the signal propagation path, and does not have any stub lines or similar.

Additionally, the radar level gauge system may advantageously be configured to compensate for variations in equivalent waveguide length through hardware, software, or a combination thereof.

According to one example, such a compensation can be achieved by mapping the dependence of the equivalent waveguide length of the power level adjusting (or amplifying) circuitry on the operating temperature thereof. This dependence can, for example, be stored in a look-up table which can be used by the radar level gauge system to compensate for variations in equivalent waveguide length due to variations in temperature. Such a mapping can, of course, be made in respect of other relevant parameters as well, including for example the signal frequency and/or bandwidth.

The compensation may take place in software as a "final" adjustment, and/or the operating parameters of the power level adjusting circuitry can be adjusted in order to keep the equivalent waveguide length thereof substantially constant. If the power level adjusting circuitry is implemented as a transistor-based amplifier, the equivalent waveguide length thereof may, for example, be altered by adjusting the bias, such as the drain-source voltage and gate-source voltage (in case field effect transistors are used).

Moreover, the power level adjusting/amplifying circuitry may further include compensating circuitry, which, based on measurements or stored data, compensates the equivalent waveguide length to keep it substantially constant.

The person skilled in the art realizes that the present invention by no means is limited to the preferred embodiments described above. For example, the transceiver may include more than one signal generator, such as one transmitter oscillator for the transmitter branch, and one receiver oscillator for the receiver branch.

What is claimed is:

1. A radar level gauge system, for determining a filling level of a product contained in a tank, said radar level gauge system comprising:
    a transceiver including:
        a signal generator for generating electromagnetic signals for transmission;
        a transmitter branch for transmitting said electromagnetic signals; and
        a receiver branch for receiving electromagnetic signals,
    said transmitter branch and said receiver branch being connected to a common transceiver input/output terminal;
    a propagation device connected to the transceiver input/output terminal for allowing transmitted electromagnetic signals to propagate towards a surface of said product inside the tank, where signals are reflected, and for returning reflected electromagnetic signals back from said surface of the product;
    processing circuitry connected to said transceiver and configured to determine said filling level based on said reflected electromagnetic signals; and
    power level amplifying circuitry connected between said transceiver input/output terminal and said propagation device and configured in such a way that said transmitted electromagnetic signals are attenuated and said reflected electromagnetic signals are amplified.

2. The radar level gauge system according to claim 1, wherein said power level amplifying circuitry comprises a one-stage amplifier.

3. The radar level gauge system according to claim 1, wherein said power level amplifying circuitry comprises a two-stage amplifier.

4. The radar level gauge system according to claim 1, wherein said power level amplifying circuitry is adapted to keep an equivalent waveguide length thereof substantially independent of environmental conditions and operating point of said power level amplifying circuitry.

5. The radar level gauge system according to claim 4, wherein said power level amplifying circuitry is configured in such a way that it has such a small physical extension that an equivalent length of a transmission path of said electromagnetic signals through said power level amplifying circuitry is shorter than said wavelength of the electromagnetic signals.

6. The radar level gauge system according to claim 1, further comprising temperature sensing circuitry for indicating an operating temperature of said power level amplifying circuitry.

7. The radar level gauge system according to claim 6, wherein said radar level gauge system is adapted to control operating conditions of said power level amplifying circuitry in response to said indicated operating temperature, in order to keep an equivalent waveguide length thereof substantially independent of operating temperature.

8. The radar level gauge system according to claim 1, wherein said processing circuitry is configured to adjust said determined filling level based on at least one of an operating point of said power level amplifying circuitry and environmental conditions, to compensate for differences in an equivalent waveguide length of said power level amplifying circuitry.

9. The radar level gauge system according to claim 1, further comprising a mixer for mixing said reflected electromagnetic signals with signals indicative of said transmitted electromagnetic signals, to thereby enable determination of said filling level based on a difference between said received and transmitted electromagnetic signals.

10. The radar level gauge system according to claim 1, wherein said transmitter branch and said receiver branch are connected to said transceiver input/output terminal via power dividing circuitry.

11. The radar level gauge system according to claim 1, wherein a total power of said transmitted signals, following attenuation, is below −41.3 dBm.

12. The radar level gauge system according to claim 11, wherein said total power of said transmitted signals, following attenuation, is below −46 dBm.

13. The radar level gauge system according to claim 12, wherein said total power of said transmitted signals, following attenuation, is below −50 dBm.

14. A radar level gauge system, for determining a filling level of a product contained in a tank, said radar level gauge system comprising:
    a transceiver including:
        a signal generator for generating electromagnetic signals for transmission;
        a transmitter branch for transmitting said electromagnetic signals; and
        a receiver branch for receiving electromagnetic signals,
    said transmitter branch and said receiver branch being connected to a common transceiver input/output terminal;
    a propagation device connected to the transceiver input/output terminal for allowing transmitted electromagnetic signals to propagate towards a surface of said product inside the tank, where signals are reflected, and for returning reflected electromagnetic signals back from said surface of the product;
    processing circuitry connected to said transceiver and configured to determine said filling level based on said reflected electromagnetic signals; and
    power level adjusting circuitry connected between said transceiver input/output terminal and said propagation device, and configured to adjust a power level of said transmitted electromagnetic signals by a transmission gain factor, and to adjust a power level of said returned reflected electromagnetic signals by a reception gain factor, said transmission gain factor being smaller than said reception gain factor, wherein said power level adjusting circuitry comprises at least one active component.

15. The radar level gauge system according to claim 14, wherein said active component is a transistor.

16. The radar level gauge system according to claim 14, wherein said power level adjusting circuitry comprises a one-stage amplifier.

17. The radar level gauge system according to claim 14, wherein said power level adjusting circuitry comprises a two-stage amplifier.

18. The radar level gauge system according to claim 14, wherein said power level adjusting circuitry is adapted to keep an equivalent waveguide length thereof substantially independent of environmental conditions and operating point of said power level adjusting circuitry.

19. The radar level gauge system according to claim 18, wherein said power level adjusting circuitry is configured in such a way that it has such a small physical extension that an equivalent length of a transmission path of said electromagnetic signals through said power level adjusting circuitry is shorter than said wavelength of the electromagnetic signals.

20. The radar level gauge system according to claim 14, further comprising temperature sensing circuitry for indicating an operating temperature of said power level adjusting circuitry.

21. The radar level gauge system according to claim 20, wherein said radar level gauge system is adapted to control operating conditions of said power level adjusting circuitry in response to said indicated operating temperature, in order to keep an equivalent waveguide length thereof substantially independent of operating temperature.

22. The radar level gauge system according to claim 14, wherein said processing circuitry is configured to adjust said determined filling level based on at least one of an operating point of said power level adjusting circuitry and environmental conditions, to compensate for differences in an equivalent waveguide length of said power level adjusting circuitry.

23. The radar level gauge system according to claim 14, wherein a total power of said transmitted signals, following attenuation, is below −41.3 dBm.

24. The radar level gauge system according to claim 23, wherein said total power of said transmitted signals, following attenuation, is below −46 dBm.

25. The radar level gauge system according to claim 24, wherein said total power of said transmitted signals, following attenuation, is below −50 dBm.

* * * * *